Patented Jan. 27, 1931

1,790,521

UNITED STATES PATENT OFFICE

HAROLD S. DAVIS, OF BELMONT, AND CHARLES G. HARFORD, OF WATERTOWN, MASSACHUSETTS, ASSIGNORS, BY MESNE ASSIGNMENTS, TO PETROLEUM CHEMICAL CORPORATION, OF NEW YORK, N. Y., A CORPORATION OF DELAWARE

PRODUCTION OF USEFUL ESTERS OF ORGANIC ACIDS AND OLEFINES

No Drawing.     Application filed January 4, 1927.   Serial No. 159,015.

This invention relates to useful ester products of and the production of useful esters of organic acids and olefines by the treatment of olefine-bearing materials; for example those olefine-bearing derivatives of natural hydrocarbon materials of a kind capable of economic production by heat treatments; particularly by vapor-phase cracking of hydrocarbons such as petroleum or petroleum fractions, distillates or mixtures; results of treatment by distillation of coal; and natural gas, its fractions and derivatives.

This invention is in part the result of our discovery that an organic acid may be made to react more effectively than heretofore known with olefines, including any olefine mixtures, such as those of the cracked hydrocarbons, under certain conditions, restrictions and qualifications, which comprise the substantial absence from the reacting mixture of certain inhibiting inclusions usually present in cracked hydrocarbon and other olefine-bearing mixtures, and now found to prevent or to make impracticably difficult the direct chemical combination of the organic acid and the olefine or olefines desired to be combined into an ester. The improved facility of reaction amounts to capacity to induce the chemical reaction of the reactants in substantially equimolar proportions, without necessarily subjecting the materials involved in the reaction to extraneous heating.

We have found, for example, that organic acid esters of the desired commercial boiling-point ranges may be produced severally or in admixture by a reaction with mixed olefine bases, from the lower olefine fraction of the group of olefines obtained by vapor phase cracking for an optimum output of olefine-bearing vapors, which lower fraction may contain propylene, butylenes, amylenes, and hexylenes. The recommended treatment may comprise reaction on one or more of these substances, from whatever source, in the cold with one of the organic acids, of which acetic acid is typical, using due precaution in the preparation of the olefine material, and with the aid of a facilitator of the reaction as hereinafter explained, with the result of obtaining an ester product nearly corresponding to the theoretical yield, the high yield being attributed in part to the absence of inhibiting substances either before the fact of reaction or produced by the reaction itself.

We have discovered by research that certain hydrocarbon derivatives inevitably associated with olefines derived from natural gas or coal gas or produced by the most effective cracking treatment of hydrocarbon materials for the production of olefines, prevent or inhibit esterification reaction between the reactable olefines and organic acids. Whatever may be the cause of this effect, the presence of the inhibiting substances in a reaction mixture for esterification unmistakably results in causing substances which otherwise would react not to react to form an ester. We have further discovered that the inhibiting substances may be rendered harmless in or removed from the materials to be esterified, for example by a selective reaction on the hydrocarbon materials to be esterified and separation of the reaction products from the remainder. Whereupon, on mixing the remainder of the hydrocarbon materials and an organic acid under suitable conditions, the acid and the olefine or olefines react to ester, the practicable yield of ester approaching the theoretical quantity, and a substantially pure esterified product resulting; the selective reaction with the inhibiting substances having a secondary value by causing the removal from the reacting materials for esterification of non-esterifiable hydrocarbon substances difficult or impossible subsequently to separate from the ester sought. One result of the recommended steps of this invention is therefore to produce esters having their origin in hydrocarbon substances, and which do not contain as deleterious impurities mixtures with inseparable substances not desired as ingredients of the product.

This invention further relates to forming esters from olefines and organic acids by the promotion of direct reaction between the olefine and the acid in such a way as to avoid reaction-hindering products of the esterification reaction, and to permit use of a minimum of the more expensive component of the reacting mixture, usually the organic acid.

One object of the present invention is to utilize the mentioned discoveries by providing an improved process for the esterification of olefine-containing hydrocarbon materials, and to effect a high yield of organic acid esters by simple and effective steps. Another object of the invention is to provide an improved process for the esterification of olefine-containing material by which the destructive action of reagents heretofore employed may be obviated and by which undue polymerization or condensation of esterifiable material may be avoided. Another object of the invention is to provide a process in which olefine-containing hydrocarbons may be caused to react with an organic acid, or material containing available organic acid, without the use of excessive quantities of acid.

A further object of the invention is to provide a new process for the esterification of material containing ester-forming substances prone to condensation or polymerization and inhibitory to the formation of esters, in such a way as to cause the ester-forming substances to react to ester without substantial loss of ester-forming substances by polymerization or failure to react to ester, and a still further object of the invention is to provide a process utilizing in a new way a catalyst, facilitator or adjuvant from bringing about the esterification of olefines and an organic acid or a material containing an available organic acid adapted to react with olefines to form esters, to cause a high yield of a substantially pure ester or mixture of esters.

The invention will now be explained with the aid of specific instances of practice, but is of course independent of any of the species by which it may be exemplified or which it may include.

It has been found that esterification reactions do not proceed satisfactorily in the presence of certain materials which are always associated with olefines of the mentioned gases or produced by the effective and economical cracking treatment of hydrocarbon vapors, notably certain unsaturated hydrocarbons such as olefines of so-called tertiary base-structure, which are more reactive than the olefines of secondary-base structure. By "tertiary-base" and "secondary-base" olefines this application refers to those structurally different olefines whose halogen-acid reaction products respectively hydrolize to tertiary and to secondary alcohols; the tertiary-base group are very highly reactive to certain acids. These unsaturated hydrocarbon bodies, when present, prevent or inhibit the reaction of secondary-base and less reactive olefines with organic acids. The general nature of and desirability of removing these inhibiting materials and certain steps for their removal from olefine-bearing substances have also been mentioned in the applications for Letters Patent of Harold S. Davis and Wallace J. Murray, Serial No. 10,992, filed February 24, 1925; of Harold S. Davis, Serial No. 43,208, filed July 13, 1925; and of Harold S. Davis, Serial No. 65,497, filed October 28, 1925 as consequences of certain treatments forming a part of the processes therein claimed. The present invention is concerned particularly with processes for esterification in which certain preliminary treatments mentioned in the applications above referred to and other treatments may be utilized for the suppression of inhibitions to esterification, and further relates to treatment of olefine-containing material to produce a high yield of a substantially pure ester product. The way in which the esterification of olefines in the presence of these more reactive bodies is inhibited is not definitely known, but it is a tenable assumption that this effect is due at least in part to either a preferential reaction with the organic acid, or is due to a direct combination of the catalyst or facilitator (employed to aid the reaction to esters) with the inhibitors. The inhibiting materials interfere with the esterification reaction also through their formation of objectionable products, particularly polymerized or condensed bodies, which are generally soluble in and are not readily removable or separable from the esters. Inert materials sometimes present in small quantities in a preferred kind of fraction for esterification obtained from the vapor phase cracking of oils may comprise saturated or paraffin hydrocarbons and certain cyclic hydrocarbons which are not known materially to affect the combining powers of the olefines, except as diluents of the reacting components in the esterification reaction. Typically, the material for esterification contains no substantial amount of these hydrocarbons.

In order to treat the olefine material containing or associated with undesirable foreign substances, for example, the material obtained by the vapor phase cracking of hydrocarbons, for the production of esters, it is recommended first to remove from secondary-base and other useful components, tertiary base olefines. The unsaturated hydrocarbons must be substantially removed from the hydrocarbon mixture before the olefines can be efficiently esterified.

One process recommended for removing the tertiary-base olefines or other unsaturated hydrocarbons more reactive than secondary-base olefines, comprises agitating the mixture of hydrocarbons with a halogen acid, for example a hydrochloric acid solution, the reaction preferably being carried on at an ordinary temperature, without subjecting the material to extraneous heating, the concentration of the hydrochloric acid solution being preferably between about 20 and 25%. The desired concentration of the hydrochloric acid is preferably maintained during the reaction by passing gaseous hydrochloric acid into the mixture until the reaction is complete. The tertiary base hydrocarbons are selectively halogenated by the treatment with the hydrochloric or other halogen acid, the acid reacting directly with these hydrocarbons to form an addition product. After the reaction with the hydrohalogen acid is complete, the uncombined or remaining halogen acid is allowed to settle and is drawn off from the remaining material or upper layer. The tertiary base olefine chlorides produced when treatment is with hydrochloric acid may readily be removed from the remaining olefines and other unaffected hydrocarbons, such as the secondary-base olefines or paraffins, if any, by first hydrolyzing the chlorides with water or by means of an alkaline solution, and then separating from the remaining olefines the resulting alcohols by extraction with water, the alcohols produced being readily soluble in water. The unchanged olefines remaining in the mixture from which the inhibiting substances have been thus removed may be distilled, if desired, to further purify them, or they may be directly treated to promote the addition of an organic acid to produce esters therefrom, with or without subjecting the materials to extraneous heating.

The olefine material to be treated may, if desired, be esterified at ordinary temperatures instead of at relatively elevated temperatures with advantage in the suppression of undesired side reactions, and advantage secured in capacity to operate at atmospheric or only slightly elevated pressure, according to the volatility of the material to be esterified.

We have found, for one example, that upon adding equimolar quantities of acetic acid to butene in the presence of tertiary butyl hypochlorite a reaction is promoted resulting in ester formation without the application of extraneous heat, producing a substantially pure product. It is feasible to treat liquid butene-2, for an example, at temperatures as low as −20° C., at which side reactions, particularly chlorination of the end products by the tertiary butyl hypochlorite, are then substantially eliminated. It is advisable in general and recommended to carry on this esterification reaction, which produces a monochlor alkyl acetic ester, upon olefines at working temperatures of less than 25° C.

Esterification may also be promoted and achieved by the use of other catalysts or facilitators than the hypochlorite above mentioned. When unsubstituted esters are desired, the reaction may, for example, be effected with the aid of sulfuric acid as an activator or facilitator. By the omission of heating during the esterification and by the use of substantially equimolar quantities of the olefine and organic acid a larger and purer yield of esters is obtained than is possible by the modes of treatment heretofore used. We have found, for example, in the treatment of hexylene with glacial acetic acid in the presence of sulfuric acid, that esterification takes place to form hexyl acetate at ordinary temperatures without subjecting the material to heating. In order to attain a satisfactory yield, however, it is desirable to agitate the reacting mixture or to employ other expedients hereinafter mentioned for bringing about the reaction within a reasonable time. If, for example, 0.5 mols of acetic acid, together with about 0.14 mols of concentrated sulfuric acid and about 0.5 mols of hexylene-2, are mixed without agitation or other means for accelerating interaction, and the material is allowed to stand for several days at room temperature, about 0.24 mols only of hexyl acetate are produced. The reaction in this case does not run to completion within the time allowed for the reaction because the components or reacting materials are substantially non-miscible and at least two distinct layers of different phases of the materials are formed on standing. If the same components or reacting materials are mixed together and then agitated, however, a greatly increased yield will be obtained within a comparatively short period of time; or the usual expedient for shortening the reaction time of heating the mixture may be resorted to.

The increased yield obtained by agitation is attributed in part to the fact that after the esterification reaction is initiated the ester increases the solubility of each component in the other; agitation provides a degree of reacting contact which furthers the esterification reaction until a sufficient amount of the ester is formed to cause relatively complete solubility of one component in the other or, in another view, effects a homogeneous solution by uniting or blending in one phase the separate phases of the normally immiscible components of the reaction mixture and the ensuing intimate contact of the components then enables an increasing rate of reaction. This reaction like others familiar to chemists, is increased in rate by increase of temperature. The esterification reaction may also be hastened or increased in an equivalent manner by the direct addition of a material which will cause the separate layers or different phases of the components to blend or unite into one phase. By this expedient the yield of ester may be substantially increased, and the esterification reaction may thus run substantially to completion in a comparatively short period of time without the formation of undesired products or impurities and without extraneous heating.

We recommend, for an example, adding to the reaction mixture a sufficient quantity of the end product of the reaction to unite or blend the normally separate layers of the reaction components into one phase, whereupon the esterification of the olefine proceeds at room temperature and runs substantially to completion within a short period of time. One material recommended for this purpose is the ester or ester mixture from a previous batch or reaction of the materials treated, this to be added in sufficient amount to form on preliminary agitation a homogeneous mixture. The steps, above described, for esterification of olefines with organic acid material in the presence of a catalyzer are particularly applicable to cases in which the materials treated are substantially pure or, in other words, are unmixed with inhibiting substances, or large proportions of inert or other foreign materials, and, especially are unmixed with the inhibiting bodies of cognate source, above mentioned.

The manner in which the esterification reaction time may be lessened by the addition of a blending material to cause the uniting of the components of the reaction mixture may be illustrated by the following example: If 1 mol of pentene-2 mixed with 1 mol of acetic acid, and about 0.1 of a mol of 90% sulfuric acid is added thereto, all at an initial temperature of 25° C., and the resulting mixture is shaken or agitated for about forty-eight hours, or until a sufficient amount of amyl acetate, the reaction product, is formed to blend the components or layers of the reacting materials into a single phase (so that instead of a multi-phase system a one-phase system is formed) and the solution is then permitted to stand for about five days, it will be found that about 0.8 mols of amyl acetate have been formed. The amyl acetate in the solution is then recovered by adding water to the reaction mixture so as to dissolve out the remaining acetic acid and sulfuric acid in the solution, and the aqueous liquor is separated from the insoluble ester by settling and decantation. But if initially the reaction mixture be supplied with 0.25 mols of the reaction product, amyl acetate, the stirring step may be reduced to merely forming an initial mixture, and the reaction will then proceed to substantial completion as before.

The reaction of other olefines at normal temperatures with other organic acids takes place in the same manner, and substantially the same steps of treatment to recovery of the esters formed may be employed. We have found, for example, that amyl propionate and hexyl formate may be readily formed from the corresponding olefines and organic acids, the reaction of the corresponding materials being preferably initiated through the addition of a small amount of the corresponding ester to be formed in the manner above explained in order to produce a one-phase system in which the esterification reaction progresses at a suitable speed.

The treatment with hydrochloric acid or other halogen acid for the removal of materials inhibiting the esterification reaction before the olefines are caused to react with organic acids causes substantially no polymerization of the olefines by the acid treatment, and the material to be esterified remains unaltered or unacted upon, and is thereafter in condition readily to be converted into substantially pure esters.

Under certain conditions, particularly if the material to be treated comprises mainly tertiary base olefines, modified steps are available for the removal of inhibitors such as tertiary-base olefines from olefine-containing hydrocarbons. For example, a selective treatment with sulfuric acid of a certain strength may be resorted to. Treatment for removal of the inhibitory substances with sulfuric acid has certain disadvantages including the formation of non-esterifiable polymers, which in a particular case may be outweighed by distinct commercial advantages, including comparatively low cost and avoidance of handling the more corrosive hydrochloric acid; sulfuric acid treatment for the removal of esterification inhibitors may thus well be employed for the purpose explained in cases in which the alkyl-acid absorption product can be economically utilized and when the olefine material treated is abundant and cheap.

Sulfuric acid may not only react with the tertiary-base olefines, but depending upon acid concentration and temperature, may polymerize the secondary base olefine hydrocarbons, which should not be diminished in quantity if it can be avoided. Polymerization losses increase with the time of treatment and with increase in the temperature of treatment. In order to render the treatment with sulfuric acid commercially advantageous, it is desirable to treat with acid of not to exceed 70% concentration and preferably of 63% concentration, and that the treatment be carried out in as short a time as possible so as to minimize the loss of olefine material by polymerization.

This treatment with sulfuric acid to remove the inhibiting substance therefore may be desirably resorted to alternatively to the preferred halogen acid treatment when loss of material can be counterbalanced by a difference in cost of the acid treatment. The sulphuric acid treatment may comprise treating a mixture of the unsaturated hydrocarbons with a substantial quantity, for example, about a third of the volume of the material treated of a sulphuric acid solution, preferably of about 63% strength, at a temperature at or below 24° C., the mixture being agitated until the sulfuric acid solution layer reaches a substantially constant specific gravity. Preferably this treatment is performed with agitation in two stages about two-thirds of the acid solution being used in the first stage. The sulfuric acid extract is non-miscible with and heavier than the hydrocarbons, soluble in water, and therefore may readily be removed from the olefines and other hydocarbons, if any, which are insoluble in water, by any usual separation steps.

The selective treatment with sulfuric acid of certain limited strength to preferentially remove the more reactive unsaturated hydrocarbons which inhibit esterification proceeds upon the fact that the tertiary-base hydrocarbons, are reactive toward sulfuric acid of certain concentrations in different degrees so that a certain strength of acid may substantially completely absorb and/or convert the inhibitors into separable reaction products. For example, butene-2 and isobutene have a widely different reactivity toward sulfuric acid of 63% strength, and if a mixture of these hydrocarbons be treated with sulfuric acid of this concentration the isobutene will be substantially completely dissolved before the butene-2 is perceptibly attacked or affected.

The sulfuric acid treatment or extraction is preferably carried on in two stages in order to minimize the amount of acid required in the process, and also to insure substantially complete extraction of the more highly reactive tertiary-base olefines.

Whenever the sulfuric acid treatment of the esterification inhibiting inclusions is resorted to, it is preferred to complete the separation of the unaltered hydrocarbons and polymers resulting from the acid treatment by an intervening fractional distillation of which the polymers are the residue. For example, the distillation cut point for the overhead distillate may be at 80° C. or lower depending upon the olefines desired to be esterified. For example, if no ester higher in molecular weight than amyl is desired, the cut point should be approximately 50° C. This cut point may be the end point of the original hydrocarbon mixture.

Under some circumstances, it may be found desirable to further treat the distilled material by extracting with sulfuric acid of a higher concentration than the 63% acid, depending upon the efficiency of the foregoing treatment with the dilute acid.

For a quantitative instance of practice, 12,899 gallons of a light hydrocarbon fraction, derived from the vapor phase cracking of a particular gas oil (at an average temperature of 1135° F.), and comprising the butylenes, amylenes and hexylenes and some higher boiling unsaturated hydrocarbons were treated with two successive portions of 63% $H_2SO_4$, while maintaining the temperature between 18 and 20° C. In all, 1900 gallons of 63% sulfuric acid were used in treating the above quantity of light hydrocarbons, of which quantity 60% was used in the first stage. The hydrocarbon material contained initially 9947 gallons of materials boiling up to 80° C.; there was obtained from the residual hydrocarbons after separating the 63% acid extract and distilling to segregate the fraction boiling up to 60° C., 5029 gallons of material suitable for direct acetylation, and 1963 gallons of material boiling in the motor fuel range, between 60° and 225° C. In accordance with the foregoing description of the process, the 5029 gallons of 60° C. end-point fraction, were treated with 1236 gallons of 97% acetic acid, using as catalyst 160 gallons of 100% $H_2SO_4$ under conditions of good agitation, and at a temperature of 100° C., at which temperature the pressure normally noted was 75 pounds.

The mixture of crude acetates and hydrocarbons so obtained was distilled after neutralizing the residual acetic and sulfuric acids; and the hydrocarbons recovered, boiling up to 100° C., were reprocessed with the following net result:

|  | Total gallons |
|---|---|
| Secondary butyl acetate fraction | 828 |
| Secondary amyl acetate fraction | 563 |
| Secondary hexyl acetate fraction | 240 |
| Residues containing acetates | 347 |
| Residual hydrocarbons and losses | 3051 |

After the preliminary treatment of the olefine-containing material to remove the substances which would otherwise inhibit esterification, the purified olefine material may be treated according to the process or any of its species above indicated to attain a high yield of purified esters. One recommended treatment comprises adding to the purified olefine-containing material an organic acid [or material containing available organic acid] and a facilitator, adjuvant or catalyzer adapted to bring about the esterification reaction, such as tertiary butyl hypochlorite or sulfuric acid. If acetic acid is employed in the esterification reaction with olefines and with tertiary butyl hypochlorite the substituted ester produced will be the corresponding monochloralkyl acetate. By the use of a tertiary alkyl hypohalite in the reaction certain olefines which can not be directly acetylated or converted into esters with sulfuric acid as a catalyzer for the reaction may be readily converted into the corresponding chlor esters which may be further treated in order to substitute hydrogen or an alkyl or der to substitute hydrogen or an alkyl or other group for the chlorine therein. The reaction with tertiary butyl hypochlorite produces a substantially pure ester, or a mixture of esters, if more than one olefine is present, and may be carried on rapidly at a low temperature and without extraneous heating. While the reaction might be carried on with other alkyl hypohalites, such as tertiary amyl hypochlorite, or with the corresponding hypobromites, we prefer to employ the tertiary butyl hypochlorite, the reaction being carried on in the following manner:

A mixture of tertiary butyl hypochlorite and the organic acid to be used, such as acetic acid, is slowly added to the olefine-containing material, so that the olefine-containing material will always be present in excess. In the reaction which ensues the tertiary butyl hypochlorite reacts to form tertiary butyl alcohol which may be recovered and separated from the ester by dissolving the alcohol in water, and separating the remaining ester therefrom.

Tertiary butyl hypochlorite may readily be prepared by passing chlorine gas into a dilute water solution of tertiary butyl alcohol in the presence of an alkali such as sodium hydroxide.

Any strength of tertiary butyl alcohol solution suitable to dissolve the alkali may be employed in the above reaction; a solution of about 7% strength has been found to be satisfactory. Tertiary butyl hypochlorite is only slightly soluble in water and separates on the top of the alcohol-water solution as an oily layer, from which it may be removed by decantation or otherwise. The separated hypochlorite material may be purified, if desired, by distillation or in any other suitable manner. Tertiary butyl hypochlorite reacts with olefines or an olefine such as butene-2, for example, in the presence of available organic acids or an organic acid, such as acetic acid, for example, to form the corresponding ester without reacting to form the higher chlorine compounds, and substantially without destructive side reactions taking place, the esterification reaction, in which tertiary alcohol is liberated, being represented by the following equation:

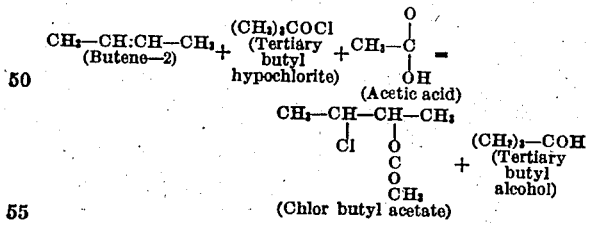

The reaction with olefine material in the presence of tertiary butyl hypochlorite evolves considerable heat, and it is advantageous to keep the working temperature at least below 25° C. in order to minimize side reactions or to prevent the chlorination of the end products formed. Yields of the ester ranging between 73 and 90% of the theoretical amounts may be readily obtained.

While an esterification reaction with the aid of a tertiary hypohalite is preferably employed for the esterification of secondary base olefines, after the inhibitors normally present have been removed by any of the desired treatments, reaction with a tertiary hypohalite may also be employed with advantage to aid in the esterification of other bodies, for example tertiary base olefines, and for other valuable uses. The specific treatment with a tertiary hypohalite, such as tertiary butyl hypochlorite, is therefore an independent invention, not herein claimed, except as exemplifying one species of a generic step in the process herein claimed for the esterification of an olefine or a mixture of olefines in the presence of suitable organic acid material, and when no substances inhibiting the esterification reaction are present.

The chlor alkyl esters produced by the reaction with the aid of tertiary butyl hypochlorite are valuable solvents and may be used unaltered for this purpose; or if desired the chlor esters produced in this way may be converted into derivatives, for example by substituting hydrogen for the chlorine, which may be accomplished by treatment with sodium amalgam or with magnesium amalgam, or be converted into chlorhydrins by heating with an equivalent amount of an alcohol, such as ethyl alcohol, preferably in the presence of a catalyst such as hydrochloric acid.

If and when sulfuric acid is relied upon as facilitator or catalyzer for bringing about the esterification of olefines in the presence of organic acids (or a substance adapted to react to produce an available organic acid) after the removal of inhibiting materials by treatment with hydrochloric acid or with sulfuric acid of 63% strength, as above described, the following example is illustrative of recommended practice:

Take 100 parts by volume of the olefine-containing material from which inhibitors have been removed and add thereto about 17 parts of glacial acetic acid and about 2½ parts of 100% sulfuric acid, the mixture being agitated preferably for about 20 hours at room temperature, and thereafter allowed to stand for about 24 hours without subjecting the materials to extraneous heat.

Now remove the sulfuric acid and residual acetic acid in the resulting ester mixture by washing with water, in any desired manner. The product remaining after washing comprises a mixture of esters and unchanged olefines as well as a small amount of a heavy polymer-like oil, from which the esters may be readily separated and recovered by distillation.

After the ester mixture has been distilled to remove the olefines which boil off at temperatures up to about 100° C., the fraction boiling between about 100° to 160° C. is preferably steam distilled and collected, this fraction consisting chiefly of secondary butyl, amyl and hexyl acetates. After the separation of this fraction any small residue remaining may be discarded.

The mixture of crude acetates obtained in the fraction between 100° to 160° C. may be further refined, if desired, according to well-known processes. One good way of refining to separate hydrocarbon inclusions, if any, and to remove or destroy traces of other foreign bodies, is to treat the ester fraction with one-half its volume of 80% sulfuric acid, which dissolves the esters, and separates the hydrocarbon into an upper layer. On diluting the lower or acid layer with water to approximately 45% acid concentration, the esters separate out, and form an upper floating layer.

The fraction of olefines boiling below 100° C. recovered in the distillation of the ester mixture may be directly converted into acetates in the manner above described for the treatment of olefines; or, if desired, the material may be recycled by charging it into the mixture of fresh olefine-containing material to be treated.

It will be observed that practice of this invention as described above permits the formation of esters directly from an olefine or olefines and a combining organic acid with high efficiency in promoting the reaction, and permits great economy in the prevention of waste of the organic acid reagent, which is the more expensive ingredient of the reacting mixture.

In many cases of practice, further economies may be realized by the partial practice only of the described reaction on the olefines, for example by utilizing any uncombined remainder of the acid for the esterification of an alcohol of high combining powers, such as normal butyl or iso amyl alcohol, with the result of producting a mixed ester of the organic acid and secondary-base olefines, and of the organic acid and the added primary, or other alcohol. One large use of esters, especially the acetic esters, being as solvents for cellulose derivatives, the direct production of mixed acetic esters of secondary and primary alcoholic bases is advantageous. The described steps for removing the tertiary-base, diolefine or other inhibiting inclusions from the olefine-bearing cracked hydrocarbons provide a material with which acetic acid of considerable dilution, for example of 90%, more or less, concentration can be made to react to effect combination of the greater part of the organic [acetic] acid, leaving a remainder uncombined of acid, twenty or thirty per centum of the organic acid. Preferably the reaction with the dilute acid is carried out with the aid of heat, and with a suitable catalyst, adjuvant or facilitator.

For example, take 100 volumes calculated on the olefine contents of an olefine mixture prepared by the removal of inhibitors as above described; 17 volumes of acetic acid of about 90% concentration, or higher; 2.5 volumes of 90% to 100% sulfuric acid. React this mixture in a suitable vessel with agitation and applied heat, for instance at a temperature of 100° C. more or less, for from one to two hours, according to the concentration of the acetic acid. The olefine materials may exceed the stated volume; an excess of the olefines is advantageous. At the end of the desired time, note the excess of uncombined acetic acid. [When this has been ascertained once under standard conditions, it is sufficient to assume the proportion of this excess in relation to the known time, temperature and concentration of materials used in the treatment.]

Add now to the reaction vessel a primary alcohol such as commercial amyl alcohol to an amount substantially equivalent to the uncombined acetic acid. Continue agitation at the attained temperature until the reaction is complete; in order to obtain the highest yield, the water of reaction should be progressively removed.

Wash the product, decant off the acetic esters, and distill as recommended in connection with the secondary-base esters hereinabove.

When acetic acid of less than 95% concentration is used, the hydrocarbon materials and the organic acid are not readily miscible, and agitation should accordingly be prolonged, if necessary beyond the recommended two hours; or a previous batch of ester may be run in, to facilitate production of a single-phase solution.

The ester products of the described reactions have common characteristics of advantage in the principal uses for such esters, and this invention includes the said ester products. The ester products of the generic process herein comprise no substantial admixture of any saturated hydrocarbon; they contain at the most less than 20% of uncombined unsaturated hydrocarbons, and may be further treated as above described to remove any traces of these; they contain no secondary alcohols. Esterification having been carried out on a purified and controllable material, the esters may be prepared from any single member or any group of the secondary-base olefines capable of separation according to boiling-point ranges by simple fractionation prior to distillation, and, as further mentioned above, the products may contain in admixture when desired the ester or esters of a primary alcohol or alcohols.

In the claims the recitation of "reagent" or an "esterifying reagent" is not intended to exclude any desirable or necessary additions to an organic acid to be combined with an olefine or olefines relied upon either to activate or facilitate or catalyze the reaction, or to promote a group reaction having as a consequence the combination to form an ester of the olefine and the organic acid.

We claim:

1. Process of esterifying secondary olefines in a mixture of hydrocarbons derived from cracking petroleum oil and containing both secondary and tertiary olefines, which comprises selectively removing the tertiary olefines from said mixture, and thereafter admixing the remanent hydrocarbon mixture with free acetic acid and a catalyst thereby esterifying the said secondary olefines.

2. Process of esterifying secondary olefines in a mixture of hydrocarbons derived from cracking petroleum oil and containing both secondary and tertiary olefines, which comprises selectively removing the tertiary olefines from said mixture by admixing said mixture with muriatic acid, while maintaining an acid concentration at which said tertiary olefines are converted to tertiary mono chlorides, hydrolyzing the tertiary mono chlorides so produced thereby producing tertiary alcohols therefrom, separating said tertiary alcohols from said hydrocarbon mixture, and thereafter admixing the remanent hydrocarbon mixture with free acetic acid and a catalyst thereby esterifying the said secondary olefines.

3. Process of esterifying secondary olefines in a mixture of hydrocarbons derived from cracking petroleum oil and containing both secondary and tertiary olefines, which comprises selectively removing the tertiary olefines from said mixture by admixing said mixture with muriatic acid, while maintaining an acid concentration at which said tertiary olefines are converted to tertiary mono chlorides, hydrolyzing the tertiary mono chlorides so produced thereby producing tertiary alcohols therefrom, separating said tertiary alcohols from said hydrocarbon mixture by extraction with water, and thereafter admixing the remanent hydrocarbon mixture with free acetic acid and a catalyst thereby esterifying the said secondary olefines.

4. Process of directly esterifying secondary olefines in a mixture of hydrocarbons derived from cracking petroleum oil and containing both secondary and tertiary olefines, which comprises selectively removing the tertiary olefines from said mixture by admixing said mixture with muriatic acid containing from 20 to 25% HCl by weight, thereby converting the tertiary olefines to tertiary mono chlorides, hydrolyzing the tertiary mono chlorides so produced thereby producing tertiary alcohols therefrom, separating said tertiary alcohols from said hydrocarbon mixture by extraction with water, and thereafter admixing the remanent hydrocarbon mixture with free acetic acid and a catalyst thereby esterifying the said secondary olefines.

Signed by us at Cambridge, Massachusetts, this thirty-first day of December, 1926.

HAROLD S. DAVIS.
CHARLES G. HARFORD.